US011770725B2

(12) United States Patent
Hviid et al.

(10) Patent No.: US 11,770,725 B2
(45) Date of Patent: Sep. 26, 2023

(54) APPARATUS, METHOD AND COMPUTER PROGRAM FOR ADJUSTING RADIO RESOURCE MANAGEMENT MEASUREMENTS

(71) Applicant: Nokia Technologies Oy, Espoo (FI)

(72) Inventors: Jan Hviid, Klarup (DK); Faranaz Sabouri-Sichani, Aalborg (DK); Daniela Laselva, Klarup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/765,898

(22) PCT Filed: Sep. 24, 2020

(86) PCT No.: PCT/EP2020/076644
§ 371 (c)(1),
(2) Date: Apr. 1, 2022

(87) PCT Pub. No.: WO2021/063783
PCT Pub. Date: Apr. 8, 2021

(65) Prior Publication Data
US 2022/0377635 A1 Nov. 24, 2022

(30) Foreign Application Priority Data
Oct. 4, 2019 (FI) ........................... 20195847

(51) Int. Cl.
*H04B 17/364* (2015.01)
*H04B 17/382* (2015.01)
(Continued)

(52) U.S. Cl.
CPC .......... *H04W 24/08* (2013.01); *H04B 17/364* (2015.01); *H04B 17/382* (2015.01);
(Continued)

(58) Field of Classification Search
CPC ............ H04B 17/0082–409; H04W 24/02–10; H04W 36/0005–385; H04W 52/02–60;
(Continued)

(56) References Cited

U.S. PATENT DOCUMENTS

2004/0204026 A1* 10/2004 Steer ....................... H04W 4/04
2008/0189970 A1 8/2008 Wang et al.
(Continued)

FOREIGN PATENT DOCUMENTS

WO WO 2016/183187 A1 11/2016

OTHER PUBLICATIONS

"3rd Generation Partnership Project; Technical Specification Group Radio Access Network; NR; NR and NG-RAN Overall Description; Stage 2 (Release 15)", 3GPP TS 38.300 V15.4.0, (Dec. 2018), 97 pages.
(Continued)

*Primary Examiner* — Timothy J Weidner
(74) *Attorney, Agent, or Firm* — ALSTON & BIRD LLP

(57) ABSTRACT

Apparatus, method and computer program for adjusting radio resource management (RRM) measurements are disclosed. The method includes: obtaining a radio channel propagation profile (902) for a user apparatus, wherein the radio channel propagation profile indicates multipath effects on a radio signal received by the user apparatus; and adjusting (904) radio resource management measurements of the user apparatus based on the radio channel propagation profile.

21 Claims, 10 Drawing Sheets

(51) Int. Cl.

| | | |
|---|---|---|
| *H04B 17/391* | (2015.01) | |
| *H04W 24/08* | (2009.01) | |
| *H04W 24/10* | (2009.01) | |
| *H04W 36/00* | (2009.01) | |
| *H04W 36/06* | (2009.01) | |
| *H04W 52/02* | (2009.01) | |
| *H04W 84/02* | (2009.01) | |
| *H04W 88/02* | (2009.01) | |
| *H04W 88/08* | (2009.01) | |
| *H04W 92/02* | (2009.01) | |
| *H04W 92/10* | (2009.01) | |

(52) U.S. Cl.
CPC .......... *H04B 17/391* (2015.01); *H04W 24/10* (2013.01); *H04W 36/0088* (2013.01); *H04W 36/06* (2013.01); *H04W 52/0216* (2013.01); *H04W 52/0225* (2013.01); *H04W 84/02* (2013.01); *H04W 88/02* (2013.01); *H04W 88/08* (2013.01); *H04W 92/02* (2013.01); *H04W 92/10* (2013.01); *Y02D 30/70* (2020.08)

(58) Field of Classification Search
CPC ... H04W 72/02–569; H04W 84/02–16; H04W 88/02–12; H04W 92/02–04; H04W 92/10; Y02D 30/70
See application file for complete search history.

(56) References Cited

U.S. PATENT DOCUMENTS

| | | | | |
|---|---|---|---|---|
| 2015/0365941 | A1* | 12/2015 | Liu | H04W 72/12 |
| 2018/0007528 | A1* | 1/2018 | Drazynski | H04W 8/005 |

OTHER PUBLICATIONS

"3rd Generation Partnership Project; Technical Specification Group Radio Access Network; NR; Physical channels and modulation (Release 15)", 3GPP TS 38.211 V15.1.0, (Mar. 2018), 90 pages.

"3rd Generation Partnership Project; Technical Specification Group Radio Access Network; NR; Radio Resource Control (RRC) protocol specification (Release 15)", 3GPP TS 38.331 v15.6.0, (Jun. 2019), 519 pages.

"3rd Generation Partnership Project; Technical Specification Group Radio Access Network; NR; Study on User Equipment (UE) Power Saving in NR (Release 16)", 3GPP TR 38.840 v16.0.0, (Jun. 2019), 74 pages.

"3rd Generation Partnership Project; Technical Specification Group Radio Access Network; NR; User Equipment (UE) radio transmission and reception; Part 1: Range 1 Standalone (Release 15)", 3GPP TS 38.101-1 V15.1.0, (Mar. 2018), 71 pages.

"3rd Generation Partnership Project; Technical Specification Group Radio Access Network; Study on channel model for frequencies from 0.5 to 100 GHz (Release 15)", 3GPP TR 38.901 V15.0.0, (Jun. 2018), 91 pages.

"3rd Generation Partnership Project; Technical Specification Group Radio Access Network; Study on channel model for frequency spectrum above 6 GHz (Release 15)", 3GPP TR 38.900 V15.0.0, (Jun. 2018), 85 pages.

CATT et al., "New SID: Study on UE Power Saving in NR", 3GPP TSG RAN Meetings #80, RP-181463, (Jun. 11-14, 2018), 5 pages.

CATT, "RRM Measurement on Power Saving", 3GPP TSG RAN WG1 Ad-Hoc Meeting 1901, R1-1901327, (Jan. 21-25, 2019), 9 pages.

Ericsson, "Email Report 105_56—RRM Related Aspects for Power Saving", 3GPP TSG-RAN2 Meeting #105bis, R2-1904155, (Apr. 8-12, 2019), 23 pages.

Ericsson, "UE-Group Wake-Up Signal in LTE-MTC", 3GPP TSG-RAN WG1 Meeting #98bis, R1-1909986, (Oct. 14-20, 2019), 11 pages.

Intel Corporation, "Power Consumption Reduction in RRM Measurements", 3GPP TSG RAN WG2 Meeting #105, R2-1900724, (Feb. 25-Mar. 1, 2019), 4 pages.

International Search Report and Written Opinion for Patent Cooperation Treaty Application No. PCT/EP2020/076644 dated Dec. 14, 2020, 16 pages.

Mohammadghasemi et al., "Mobility tracking in unknown correlated shadow fading wireless networks", IET Journals—The Institution of Engineering and Technology, vol. 12, Issue 8, (Apr. 2018), 8 pages.

Office Action for Finland Application No. 20195847 dated Mar. 26, 2021, 6 pages.

Office Action for Finland Application No. 20195847 dated Mar. 31, 2020, 8 pages.

Sony, "Reduction in RRM Measurements for UE Power Saving", 3GPP TSG RAN WG2 Meeting #105, R2-1901436, (Feb. 25-Mar. 1, 2019), 6 pages.

\* cited by examiner

APPARATUS, METHOD AND COMPUTER PROGRAM FOR ADJUSTING RADIO RESOURCE MANAGEMENT MEASUREMENTS

CROSS-REFERENCE TO RELATED APPLICATIONS

This application is a national phase entry of International Application No. PCT/EP2020/076644 filed Sep. 24, 2020, which claims priority from Finnish Application No. 20195847 filed Oct. 4, 2019, the entire contents of both of which are incorporated herein by reference.

FIELD

Various embodiments relate to adjusting radio resource management measurements.

BACKGROUND

Radio resource management (RRM) measurements are performed by a user apparatus of a cellular radio network. Based on the measurements (including quality and reception power), the user apparatus is controlled to have a radio connection with a suitable radio cell implemented by a base station. The RRM measurements may be relaxed, i.e., the user apparatus is controlled to perform less measurements to save its battery.

BRIEF DESCRIPTION

According to an aspect, there is provided subject matter of independent claims. Dependent claims define some embodiments.

One or more examples of implementations are set forth in more detail in the accompanying drawings and the description of embodiments.

LIST OF DRAWINGS

Some embodiments will now be described with reference to the accompanying drawings, in which FIG. 1 illustrates an embodiment of a general architecture of a cellular radio system;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Reference numbers, both in the description of the embodiments and in the claims, serve to illustrate the embodiments with reference to the drawings, without limiting it to these examples only.

The embodiments and features, if any, disclosed in the following description that do not fall under the scope of the independent claims are to be interpreted as examples useful for understanding various embodiments of the invention.

In the following, different embodiments will be described using, as an example of an access architecture to which the embodiments may be applied, a radio access architecture based on long term evolution advanced (LTE Advanced, LTE-A) or new radio (NR, 5G), or future cellular technologies (e.g. 6G or the like) without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or Wi-Fi), worldwide interoperability for microwave access (WiMAX), wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
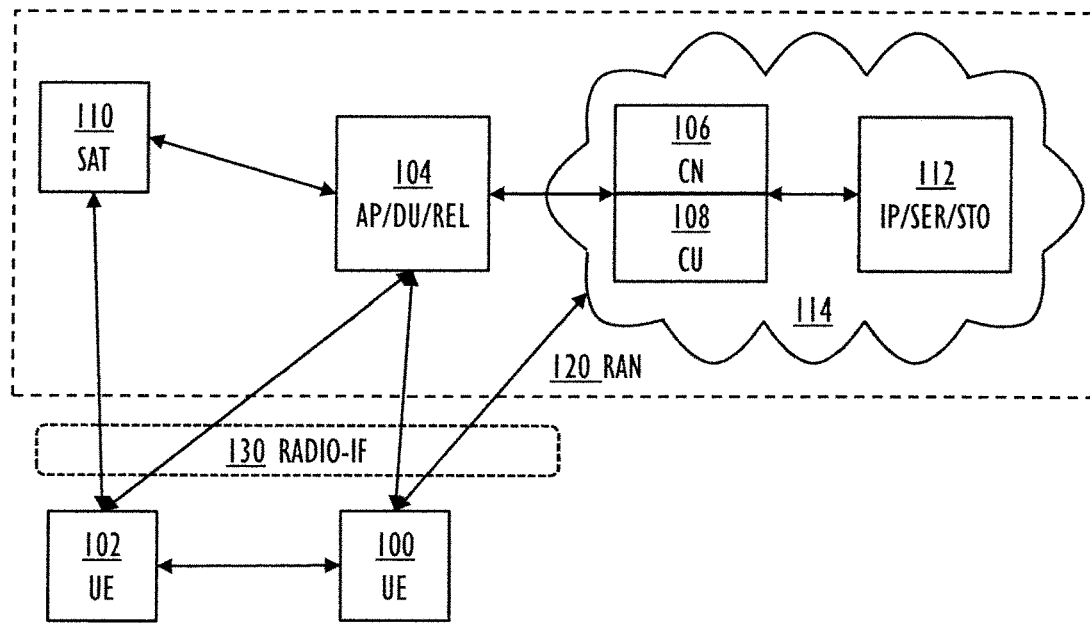

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures besides those shown in FIG. 1.

The embodiments are not, however, restricted to the system given as an example but a person skilled in the art may apply the solution to other communication systems provided with necessary properties.

The example of FIG. 1 shows a part of an exemplifying radio access network 120.

FIG. 1 shows user apparatuses 100 and 102 configured to be in a wireless connection 130 on one or more communication channels in a cell with an access node (such as (e/g)NodeB) 104 providing the cell. The physical link from the user apparatus 100, 102 to the (e/g)NodeB 104 is called uplink or reverse link and the physical link from the (e/g)NodeB 104 to the user apparatus 100, 102 is called downlink or forward link. It should be appreciated that (e/g)NodeBs or their functionalities may be implemented by using any node, host, server or access point etc. entities suitable for such a usage, for example according to a higher layer split architecture, comprising a central-unit (so-called gNB-CU) controlling one or more distributed units (so-called gNB-DU).

A communications system typically comprises more than one (e/g)NodeB 104 in which case the (e/g)NodeBs 104 may also be configured to communicate with one another through logical interfaces (such Xn/X2) running over links, wired or wireless, designed for the purpose. These interfaces may be used for data and signalling purposes. The (e/g)NodeB 104 is a computing device configured to control the radio resources of communication system it is coupled to. The NodeB 104 may also be referred to as a base station, an access point or any other type of interfacing device including a relay station capable of operating in a wireless environment. The (e/g)NodeB 104 includes or is coupled to transceivers. From the transceivers of the (e/g)NodeB 104, a connection is provided to an antenna unit that establishes bi-directional radio links to user apparatuses 100, 102. The antenna unit may comprise a plurality of antennas or antenna elements (sometimes also referred to as antenna panels, or transmission and reception points, TRP). The (e/g)NodeB 104 is further connected to a core network 106 (CN or next generation core NGC). Depending on the system, the counterpart on the CN side may be a serving gateway (S-GW, routing and forwarding user data packets), packet data network gateway (P-GW), for providing connectivity of user apparatuses 100, 102 to external packet data networks, or mobile management entity (MME), access and mobility function (AMF), etc.

The user apparatus 100, 102 (also called user equipment UE, user terminal, terminal device, subscriber terminal, etc.) illustrates one type of an apparatus to which resources on the air interface are allocated and assigned, and thus any feature described herein with a user apparatus may be implemented with a corresponding apparatus, such as a relay node. An example of such a relay node is a layer 3 relay (self-backhauling relay) towards the base station.

The user apparatus 100, 102 typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that the user apparatus 100, 102 may also be a nearly exclusive uplink only device, of which an example is a camera or video camera loading images or video clips to a network. The user apparatus 100, 102 may also be a device having capability to operate in Internet of Things (IoT) network which is a scenario in which objects are provided with the ability to transfer data over a network without requiring human-to-human or human-to-computer interaction. One technology in the above network may be denoted as narrowband Internet of Things (NB-Iot). The user apparatus 100, 102 may also be a device having capability to operate utilizing enhanced machine-type communication (eMTC). The user apparatus 100, 102 may also utilize cloud. In some applications, the user apparatus 100, 102 may comprise a small portable device with radio parts (such as a watch, earphones or eyeglasses) and the computation is carried out in the cloud. The user apparatus 100, 102 (or in some embodiments a layer 3 relay node) is configured to perform one or more of user equipment functionalities. The user apparatus 100, 102 may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many base stations or nodes, including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, above 6 GHz-mmWave, possibly using the same radio interfaces but with different parametrization). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is typically fully distributed in the radio and fully centralized in the core network. The low latency applications and services in 5G require to bring the content close to the radio which leads to local break out and mobile edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into the radio access network (RAN) 120 by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers may be placed between the core and the base station or nodeB (gNB). It should be appreciated that MEC may be applied in 4G networks as well.

In an embodiment, 5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 110 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs 104, the user apparatus 100, 102 may have access to a plurality of radio cells and the system may comprise also other apparatuses, such as physical layer relay nodes or other network elements, etc. At least one of the (e/g)NodeBs 104 may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometres, or smaller cells such as micro-, femto- or picocells. The (e/g)NodeBs 104 of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs 104 are required to provide such a network structure.

For fulfilling the need for improving the deployment and performance of communication systems, the concept of "plug-and-play" (e/g)NodeBs 104 has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). An HNB Gateway (HNB-GW), which is typically installed within an operator's network may aggregate traffic from a large number of HNBs back to a core network.

As mentioned, the radio access network 120 may be split into two logical entities called Central Unit (CU) 108 and Distributed Unit (DU) 104. The interface between CU and DU may be denoted as F1 interface. Therefore, the network operators may have the flexibility to choose different vendors for CU and DU. Different vendors may provide different failure and recovery characteristics for the units. If the failure and recovery scenarios of the units are not handled in a coordinated manner, it will result in inconsistent states in the CU and DU (which may lead to subsequent call failures, for example). Consequently, the CU and DU from different vendors need to coordinate operation to handle failure conditions and recovery, considering the potential differences in resiliency capabilities between the CU and DU.

Figure 2:
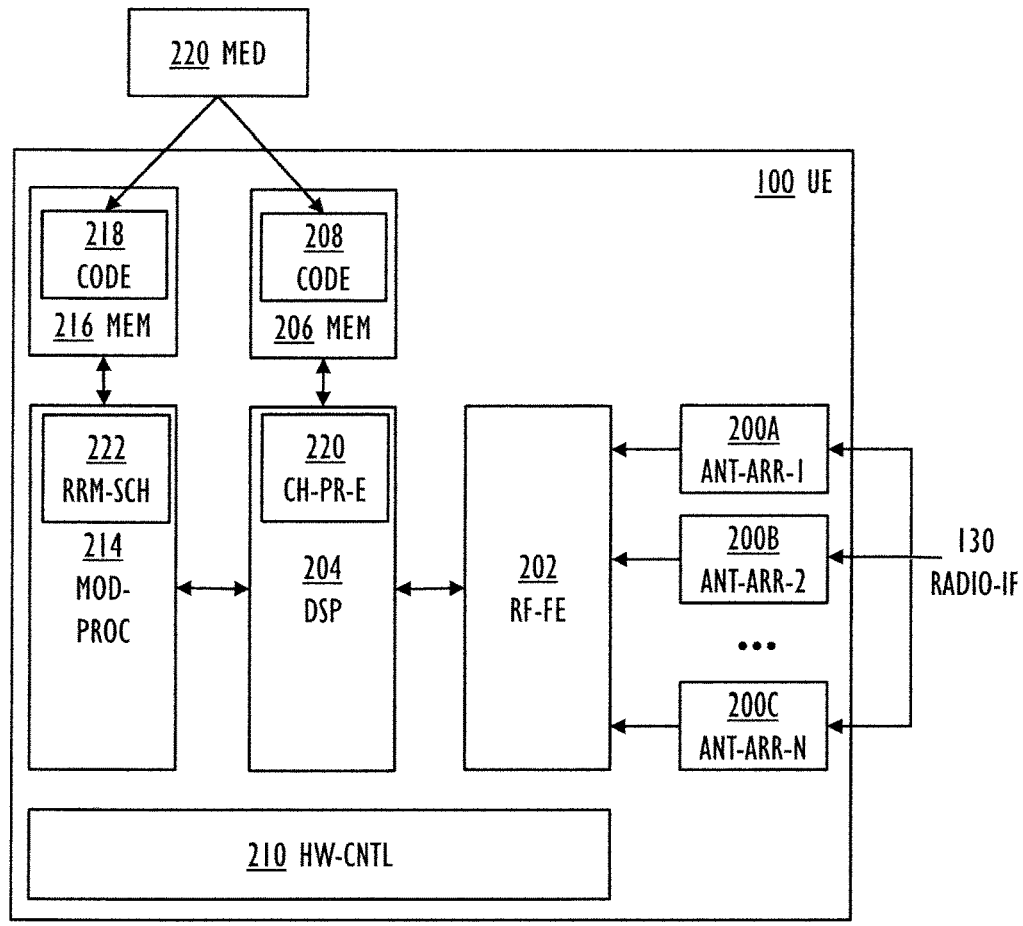
FIG. 2, FIG. 3 and FIG. 4 illustrate embodiments of a user apparatus.
Figure 3:
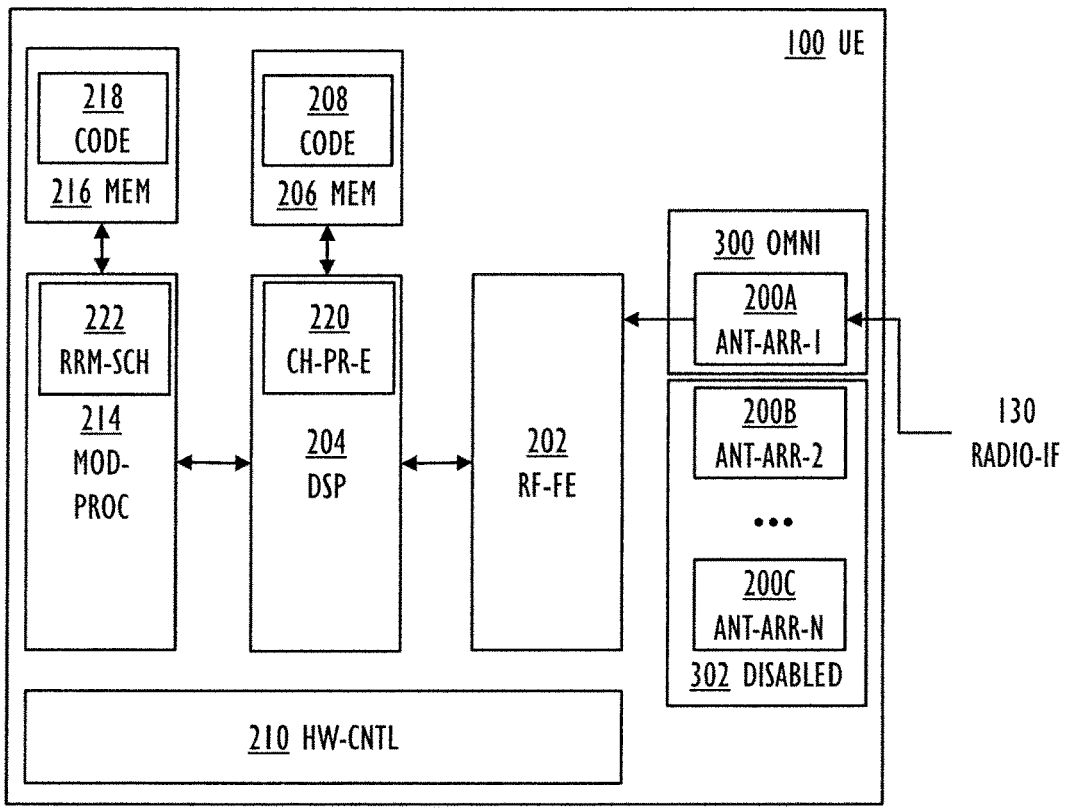
Figure 4:
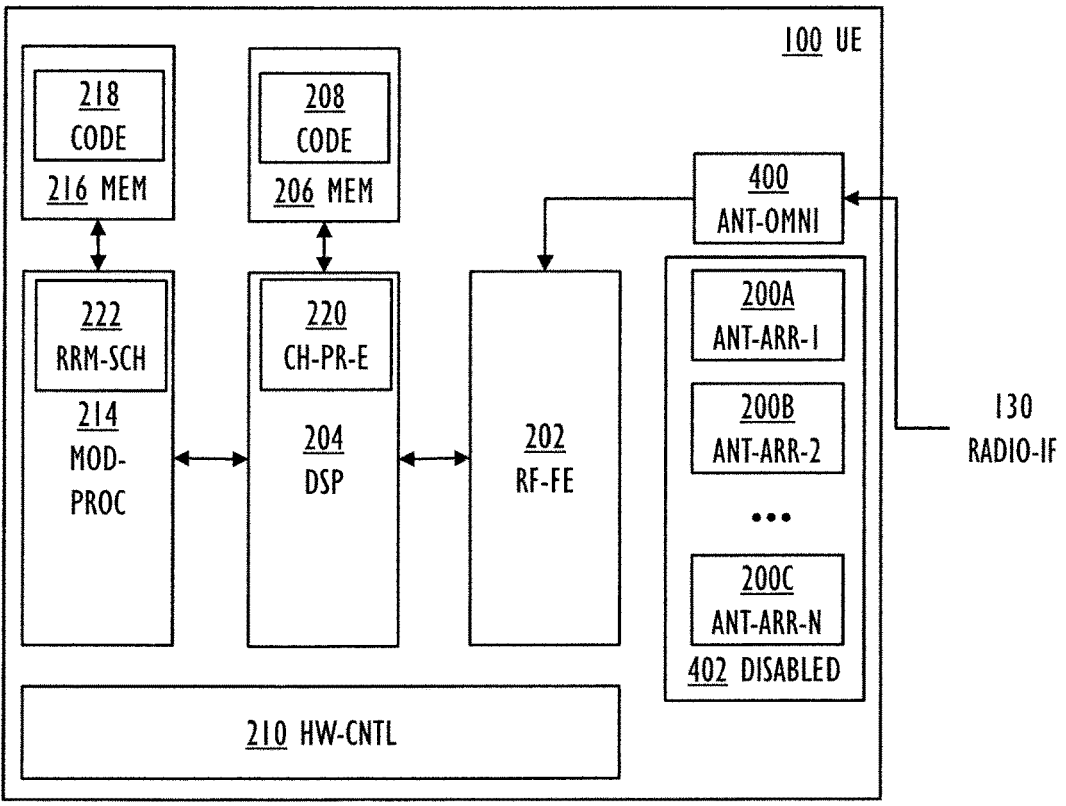
Figure 9A:
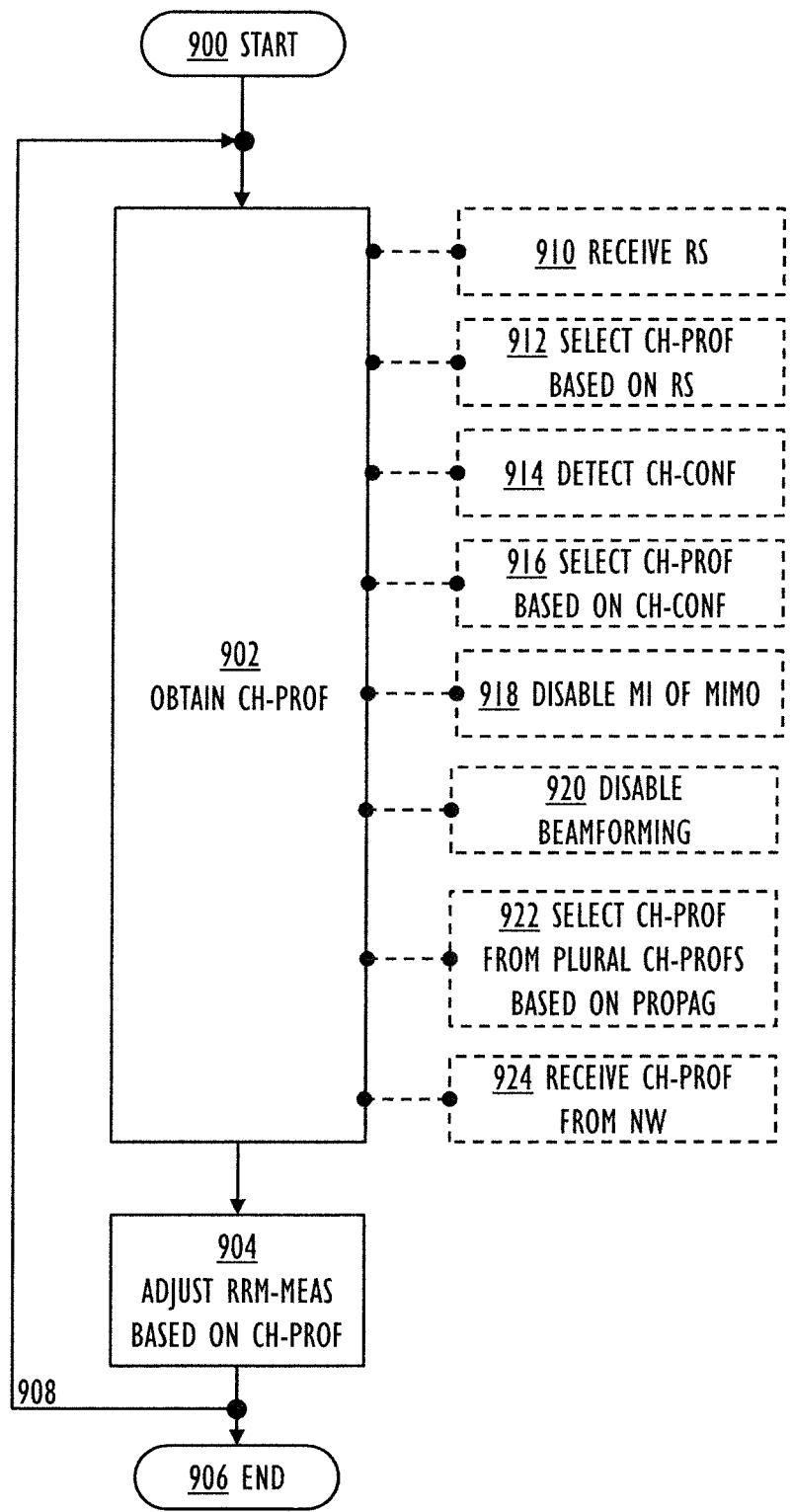
FIG. 9A, FIG. 9B and FIG. 9C are flowcharts illustrating embodiments of a method.
Figure 9B:
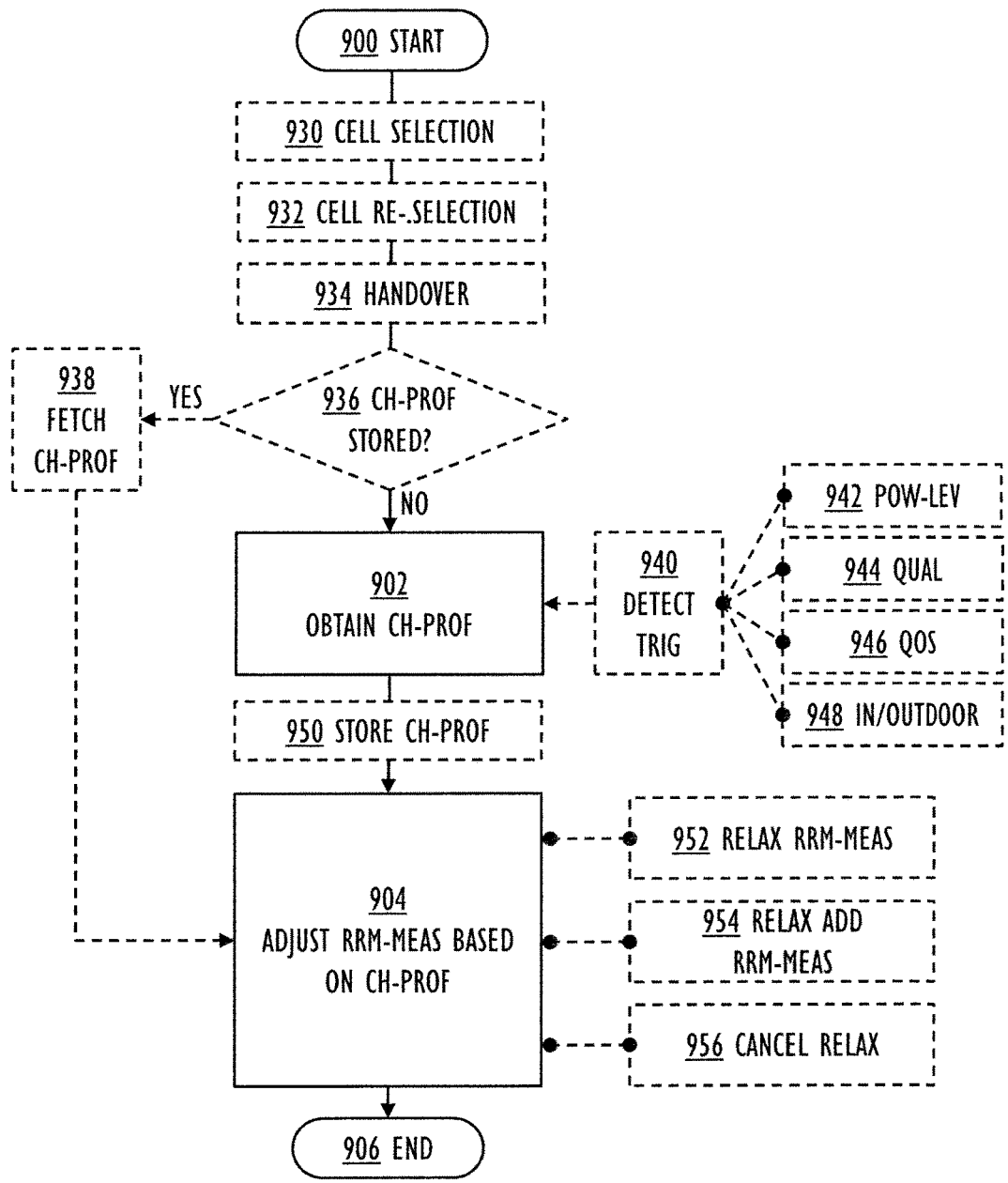
Figure 9C:
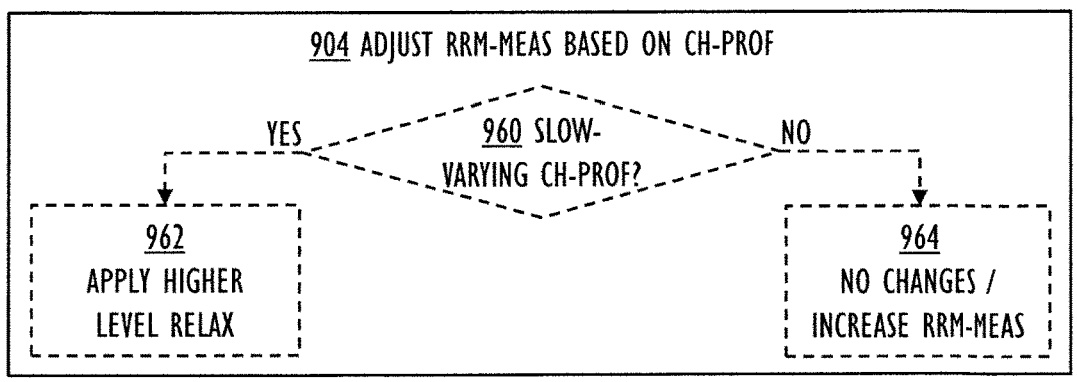

Let us study simultaneously both FIG. 2, FIG. 3 and FIG. 4, which illustrate embodiments of a user apparatus 100, and FIG. 9A, FIG. 9B and FIG. 9C, which illustrate embodiments of a method performed.

In an embodiment, an apparatus comprises means for causing the apparatus to perform the method.

In an embodiment, the apparatus is the user apparatus 100.

In an embodiment, the means comprise one or more memories 206, 216 including computer program code 208, 218, and one or more processors 204, 214 to execute the computer program code 208, 218 to cause the performance of the apparatus.

In an embodiment, the means also comprise a field-programmable gate array, and/or an application-specific integrated circuit, and/or a programmable logic device.

The term 'processor' 204, 214 refers to a device that is capable of processing data. Depending on the processing power needed, the apparatus 200 may comprise several processors 204, 214 such as parallel processors, a multicore processor, or a computing environment that simultaneously utilizes resources from several physical computer units (sometimes these are referred as cloud, fog or virtualized computing environments). When designing the implementation of the processor 204, 214, a person skilled in the art will consider the requirements set for the size and power consumption of the apparatus, the necessary processing capacity, production costs, and production volumes, for example.

A non-exhaustive list of implementation techniques for the processor 204, 214 and the memory 206, 216 includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

The term 'memory' 206, 216 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

The computer program code 208, 218 may be implemented by software. In an embodiment, the software may be written by a suitable programming language, and the resulting executable code may be stored in the memory 206, 216 and executed by the processor 204, 214.

An embodiment provides a computer-readable medium 220 storing the computer program code 208, 218, which, when loaded into the one or more processors 204, 214 and executed by one or more processors 204, 214, causes the one or more processors 204, 214 to perform the algorithm/method, which will be explained with reference to FIG. 9A, FIG. 9B and FIG. 9C. The computer-readable medium 220 may comprise at least the following: any entity or device capable of carrying the computer program code 208, 218 to the one or more processors 204, 214, a record medium, a computer memory, a read-only memory, an electrical carrier signal, a telecommunications signal, and a software distribution medium. In some jurisdictions, depending on the legislation and the patent practice, the computer-readable medium 220 may not be the telecommunications signal. In an embodiment, the computer-readable medium 220 may be a computer-readable storage medium. In an embodiment, the computer-readable medium 220 may be a non-transitory computer-readable storage medium.

The computer program code 208, 218 implements the method as an algorithm obtaining 902 a radio channel propagation profile, and adjusting 904 radio resource management measurements based on the radio channel propagation profile.

The computer program code 208, 218 may be coded as a computer program (or software) using a programming language, which may be a high-level programming language, such as C, C++, or Java, or a low-level programming language, such as a machine language, or an assembler, for example. The computer program code 208, 218 may be in source code form, object code form, executable file, or in some intermediate form. There are many ways to structure the computer program code 208, 218: the operations may be divided into modules, sub-routines, methods, classes, objects, applets, macros, etc., depending on the software design methodology and the programming language used. In modern programming environments, there are software libraries, i.e. compilations of ready-made functions, which may be utilized by the computer program code 208, 218 for performing a wide variety of standard operations. In addition, an operating system (such as a general-purpose operating system) may provide the computer program code 208, 218 with system services.

In an embodiment, the one or more processors 204, 214 may be implemented as one or more microprocessors implementing functions of a central processing unit (CPU) on an integrated circuit. The CPU is a logic machine executing the computer program code 208, 218. The CPU may comprise a set of registers, an arithmetic logic unit (ALU), and a control unit (CU). The control unit is controlled by a sequence of the computer program code 208, 218 transferred to the CPU from the (working) memory 206, 216. The control unit may contain a number of microinstructions for basic operations. The implementation of the microinstructions may vary, depending on the CPU design.

The operations are not strictly in chronological order in FIG. 9A, FIG. 9B and FIG. 9C, and some of the operations may be performed simultaneously or in an order differing from the given ones. Other functions may also be executed between the operations or within the operations and other data exchanged between the operations. Some of the operations or part of the operations may also be left out or replaced by a corresponding operation or part of the operation. It should be noted that no special order of operations is required, except where necessary due to the logical requirements for the processing order.

The method starts in 900 and ends in 906. Note that the method may run as long as required (after the start-up of the user apparatus 100 until switching off) by looping back 908 after operation 904.

In 902, a radio channel propagation profile is obtained for the user apparatus 100. The radio channel propagation profile indicates multipath effects on a radio signal received by the user apparatus 100.

Figure 7A:
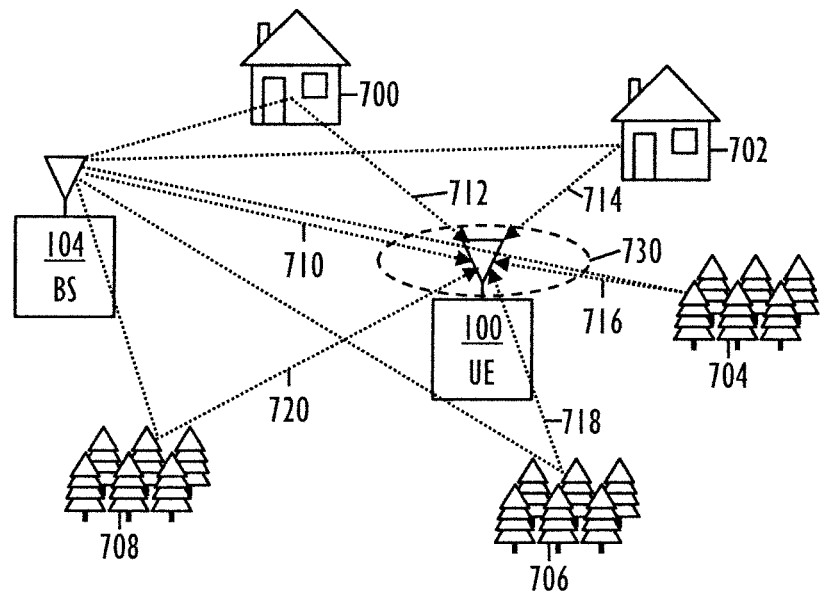
FIG. 7A, FIG. 7B, FIG. 7C, FIG. 7D and FIG. 8 illustrate embodiments of multipath propagation.
Figure 7B:
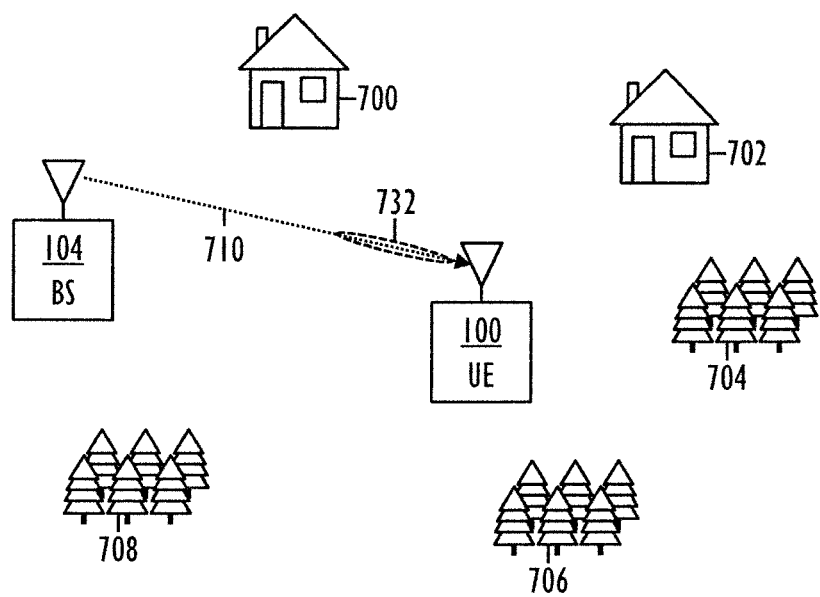
Figure 7C:
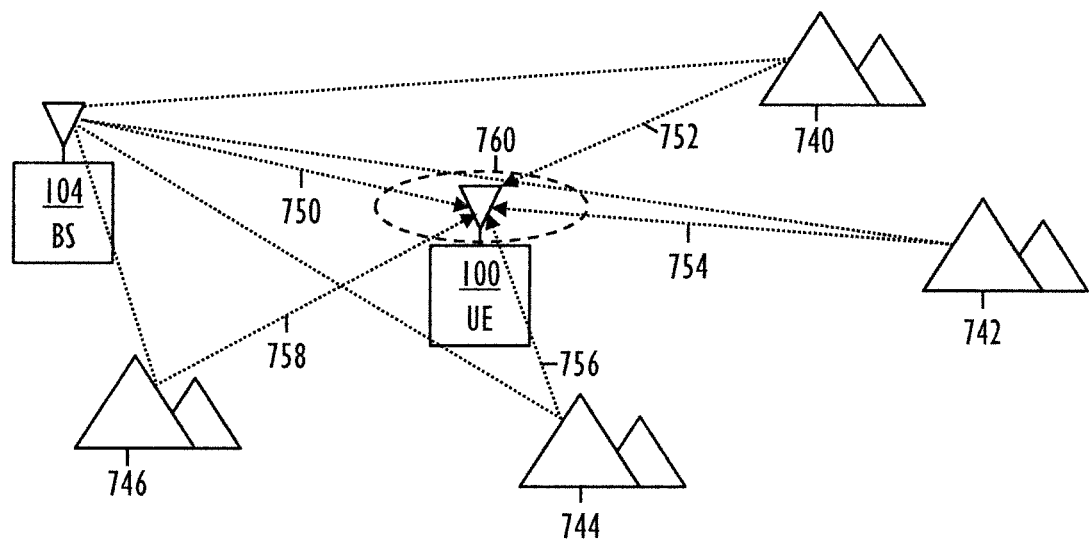
Figure 7D:
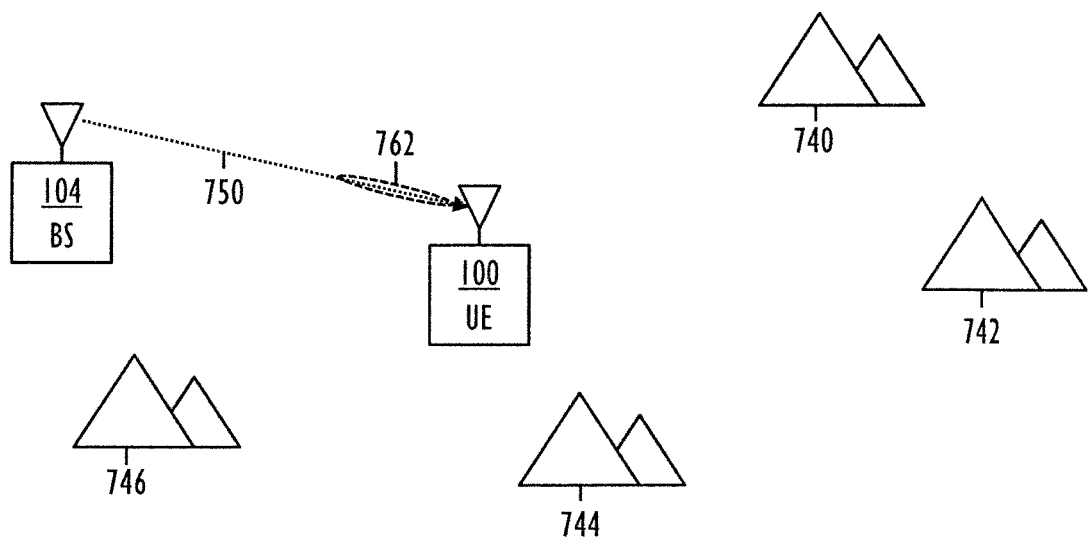

A radio channel reaches the receiving antenna(s) via multiple paths, which represent multiple reflections of the same signal over time (i.e., multi paths). The amplitude and the time (delay spread) between the reflections are highly depending on the reflector(s) located in the surrounding of the transmitting and receiving antennas and the distance to the reflector(s). Exemplary illustrations of reflections are shown in FIG. 7A for Rural Area (RA) and in FIG. 7C for Hilly Terrain (HT) profiles. HT channel profiles are characterised by a late arrival of reflections 752, 754, 756, 758 compared to the primary path 750 due to the large cell size in combination with distant reflectors 740, 742, 744, 746, while RA channel profiles are characterised by having, besides the primary path 710, no late reflections 712, 714, 716, 718, 720 arrival due to the near reflectors 700, 702, 704, 706, 708. In general, the multipath propagation effects are negative and require to be compensated since they result in fading phenomena, causing in turn a fading channel with large variations in the received signal level. Mobile networks apply several measures to compensate multipath fading by usage of diversity. Introducing reception beamforming 732, 762 on the UE shown in FIGS. 7B and 7D instead of the omnidirectional reception 730, 760 shown in FIG. 7A and FIG. 7C will suppress the majority of the reflections and thereby optimize the main path.

Figure 8:
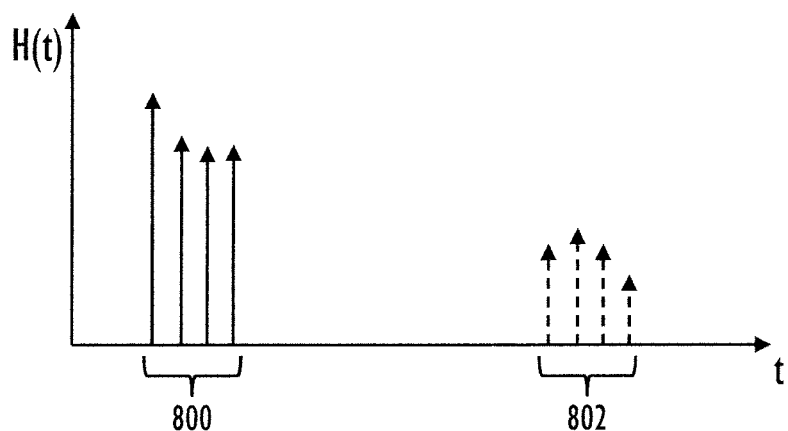

An example of the multipath impulse response 800, 802 for the hilly area is shown in FIG. 8. The reflections 802 marked with dotted lines are typically present for hilly environment. The time between the direct arrived signal and the late arrived reflections will be in the range of 10-30 us (microseconds). The impulse response for rural environment consists only of one tap (or multiple taps/reflections 800 closely gathered within a short time span like illustrated in FIG. 8) and have no late arrival reflections. In case of urban environment, the reflections will typically be in the range of 5 us.

The embodiments may employ the multipath effects explained above to determine the radio channel profile and its stability at the UE. The estimation of the UE radio channel propagation profile may take place in connection with regular control plane and/or user plane channel reception. Any channel reception may be used for this purpose in principle. The targeted channel(s) for the estimate may depend e.g. on the RRC state of the UE.

In 904, radio resource management (RRM) measurements of the user apparatus 100 are adjusted based on the radio channel propagation profile.

The RRM measurement relaxation is one of the measures suggested for UE power saving. The present embodiments introduce a mechanism for advanced RRM measurement relaxation utilizing information about the radio channel propagation profile. Using the channel profile for adjusting the measurement activity, e.g. for controlling the RRM measurements relaxation, allows to avoid/reduce potential negative mobility impact, such as handover failures.

In an embodiment, the UE may enable RRM measurement relaxation based on standard mechanisms (e.g. when meeting RSRP-based threshold condition). This relaxation (or measurement activity control/adaptation) will include increasing the periodicity of the serving cell measurements and a reduction of the number of neighbour cells in scope for measurements.

In an embodiment, the RRM measurement relaxation may be applied in a more aggressive way (i.e., by applying an even lower measurement activity) in case the estimated channel profile reveals a slowly varying channel, such as Rural Area channel, and Hilly Terrain channel. For instance, in case of RA and HT channel profiles, the short-term changes in time (short-term fading) may be expected to be very rare as the cell sizes are large, making the sudden presence of neighbour cells unlikely. Therefore, applying a more aggressive RRM measurement relaxation may be rather safe. On the contrary, when the estimate reveals a fast-varying profile such as Typical Urban (TU) or Urban Macro (UM), it may not be safe to apply measurement relaxation even if the UE is in the cell centre and is in a low mobility state. This is because in urban channels, short term changes of the radio channel are expected to occur very fast even with low/slow UE mobility state due to the large multipath propagation and to the fact that the line of sight (LOS) may change quickly to non-LOS (NLOS) because of the presence of obstacles (e.g. buildings, constructions, vegetation, etc). Therefore, in these cases, the UE may increase the measurement activity compared to the level given by the network configuration/instruction.

The user apparatus 100 may utilize different power saving schemes as specified in 3GPP TR 38.840 "3rd Generation Partnership Project; Technical Specification Group Radio Access Network; NR; Study on UE Power Saving (Release 16)".

If certain conditions—e.g. low mobility deployment, low UE speed, and/or favourable RSRP (Reference Signal Received Power) conditions—are fulfilled, the RRM measurements may be adopted to follow more relaxed requirements. The adaptation/relaxation may be realized as any combination of an increased measurement period, decreased number of samples within a measurement period, and/or an increased measurement report period.

The measurement activities are divided in measurements on reference signal(s), filtering in two levels at physical layer (L1 filtering) and then RRC (Radio Resource Control) level (L3 filtering), and finally measurement reporting (for UEs in RRC connected state). Each measurement, corresponding processing, and reporting consumes significant UE power, which may be unnecessary when the UE is in good radio conditions. Especially, adapting measurements for lower power consumption with negligible impact in performance may be achieved for UEs in low traffic areas (thus with low/no interference), in a low/semi static (low mobility) condition, where low time and frequency channel variations may be expected.

The 3GPP TR 38.840 suggests considering one or more of the below relaxation schemes for intra frequency and/or inter frequency measurements for UEs whose serving cell is in good conditions:
 increasing measurement period;
 reducing number of samples (e.g., OFDM (Orthogonal Frequency Division Multiplexing) symbols/slots) within a measurement period (e.g., SMTC (SS/PBCH Block Measurement Time Configuration) window); and
 confining RRM measurements within a measurement window and increasing the periodicity of the measurement window for intra frequency and/or inter frequency measurement.

Furthermore, the following mechanisms may be used to achieve UE power saving:
 reducing the number of cells for intra-frequency measurement;
 assuming UE may limit the processing for measurement within a constrained time period and/or with reduced complexity;
 assuming number of neighbouring cells to be measured is reduced; and
 reducing the need in neighbour cell intra-frequency measurement.

The relaxation of RRM measurements may have several levels as e.g., relaxing the inter-frequency measurements only, relaxing inter-frequency as well as intra-frequency neighbour cell measurements, and complete relaxation (including serving cell).

Figure 5A:
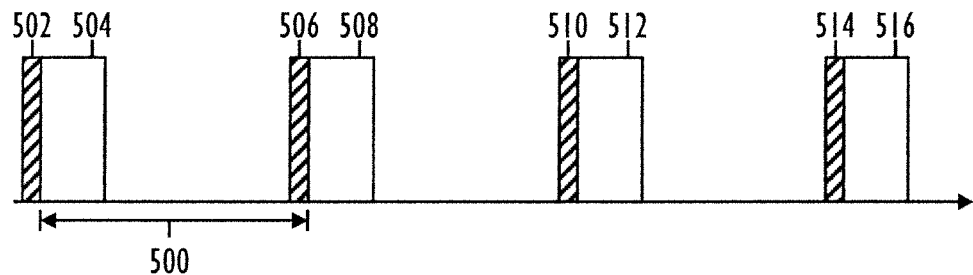
FIG. 5A, FIG. 5B, FIG. 5C and FIG. 6 illustrate embodiments of radio resource management measurements.
Figure 5B:
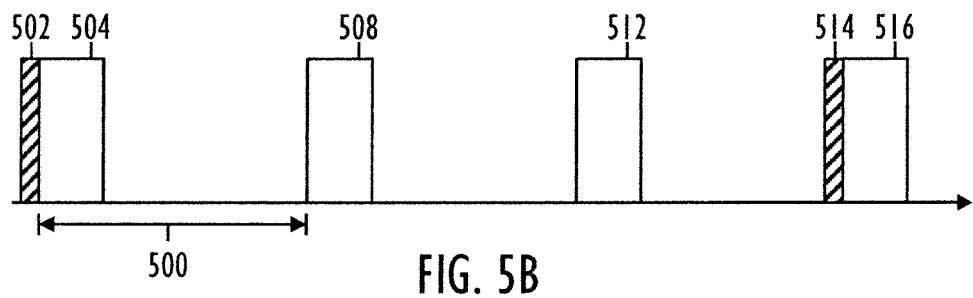
Figure 5C:
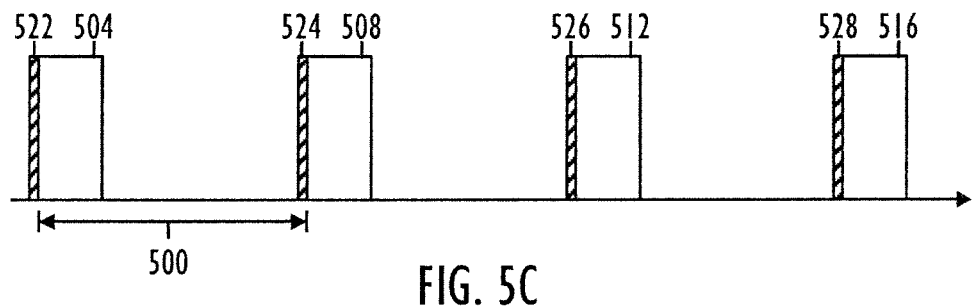

FIG. 5A, FIG. 5B and FIG. 5C illustrate the RRM measurement relaxation. Note that measurements 502, 506, 510, 514, 522, 524, 526, 528 are aligned with a DRX (Discontinuous reception) cycle 500, but this is not necessarily the case. Furthermore, it is assumed that the measurements are performed just before the DRX is switched on 504, 508, 512, 516.

FIG. 5A shows default DRX cycles 504, 508, 512, 515 and measurements 502, 506, 510, 514. FIG. 5B shows relaxed measurements by reducing the periodicity of the measurements 502, 514. FIG. 5C shows relaxed measurements by reducing the number of measurements 522, 524, 526, 528 (i.e. reducing the number of measurements within each measurement block before the DRX cycle).

Figure 6:
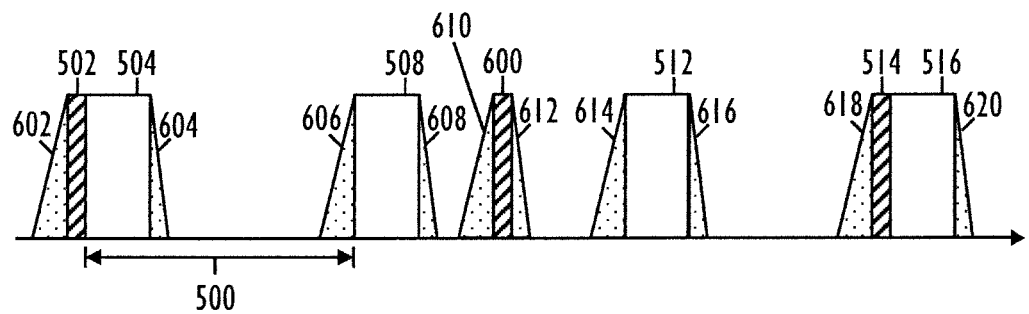

As long as a measurement period is aligned with the DRX cycle, the major contributors to the power saving is the increase of the measurement periodicity and the removal of neighbours from the neighbour cell measurements in scope. However, it is not always possible to align measurement period with the DRX, at least for all the UEs in the network (contrary to the ideal case shown in FIG. 5A). Hence, in case the measurements are not aligned with DRX, it is beneficial that all measurements—including the serving cell measurement—may be relaxed, since the UE power-up and power-down time outside the ON duration of the DRX cycle will then add significantly to the total power consumption, even when it is only one cell (the serving one) to be measured. According to UE power model defined in the 3GPP TR 38.840, a total transition time of 20 ms (or 6 ms) should be considered for UE's power-up plus power-down time from deep sleep (or light sleep) to an active state in which measurements may be performed. The ramping up/down time entails obviously a ramping up/down power consumption too, which is of 450 unit for deep sleep and 100 unit for light sleep. Considering that the measurement period lasts 3 or 5 ms at the most, this is significantly shorter than the ramping up/down. This highlights the importance from UE power saving view to avoid measuring altogether, whenever possible. FIG. 6 illustrates the measurements 502, 504, 600, DRX cycles 504, 508, 512, 516 and ramping up/down periods 602, 604, 606, 608, 610, 612, 614, 616, 618, 620. Note that the measurement 600, which is not aligned with the DRX cycle 500, results in an increase in UE's total active time and prevents it to go to deep sleep (or light sleep).

The RRM measurements (e.g. Reference Signal Received Power RSRP/Reference Signal Received Quality RSRQ) are used to constantly evaluate the quality of the UE connection towards its serving cell and its (intra/inter-frequency) neighbour cells. When in RRC Connected mode, the UE reports correspondingly the results to the network when specific change(s) in signal condition is observed, according to the configured measurements events such as measurement reporting event A3, see TS 38.331 "5G; NR; Radio Resource Control (RRC); Protocol specification". The network will make sure a UE in RRC connected state is connected to the best base station measured by signal level and/or quality, by evaluating the measurement reports and requesting a handover to a new target cell if the measurements show better coverage from the target cell.

Based on estimating a good signal condition and low mobility (e.g. RSRP serving cell being above a threshold defined by the network), the UE may either be allowed by the network to relax the RRM measurements or may decide to relax them based on UE logic for power savings—as long as it complies with the minimum requirements. However, if relaxation includes also the serving cell measurement, when the NW condition changes—mainly due to the UE's (sudden) increased mobility—the UE may fail to detect the fast change due to missing RSRP/RSRQ measurements, and this may eventually end up in a Radio Link Failure (RLF).

This embodiment provides indicators where RSRP/RSRQ measurements are utilized to estimate possibility for the UE to enter/exit RRM measurements relaxation for power saving. The embodiments may address the UE's reduced ability to track the change in radio link condition of its serving cell as well as of its neighbour cells. Furthermore, when the UE it is in power saving mode (utilizing relaxed RRM measurement schemes), no matter which measures is used to enter power saving, some embodiments still enable the UE to detect changes in the channel and exit the RRM measurement relaxation in the absence of normal RSRP/RSRQ measurements on a reference signal. and proposes alternative indicators to detect potential quality degradation due to the missing RSRP/RSRQ measures.

In an embodiment shown in FIG. 2, the user apparatus 100 comprises two processors: a digital signal processor 204, which performs the processing related to the obtaining of the radio channel propagation profile, and a modem processor, which performs the processing related to the adjusting of the RRM measurements. The user apparatus 100 may also comprises a radio frequency front-end 202, and a hardware control block 210. The user apparatus 100 may also comprise an antenna array with a plurality (N≥2) of antenna elements 200A, 200B, 200C.

In an embodiment illustrated in FIG. 9A, the obtaining 902 of the radio channel propagation profile comprises receiving by the user apparatus 100 a reference signal, and determining 912 the radio channel propagation profile based on the reference signal.

In an embodiment, the reference signal comprises a demodulation reference signal. In an embodiment, the reference signal may be a physical broadcast channel (PBCH) demodulation reference signal (DMRS), which is a special type of physical layer signal, which functions as a reference signal for decoding PBCH. The physical location of PBCH DMRS relative to the start of an SS/PBCH block is determined based on 3GPP TS 38.211 "3rd Generation Partnership Project; Technical Specification Group Radio Access Network; NR; Physical channels and modulation (Release 15)", Table 7.4.3.1-1. PBCH DMRS is always transmitted by the base stations and intended to be received by a UE when in any UE RRC state (RRC connected/inactive/idle).

In an embodiment, the reference signal is used both for obtaining 902 of the radio channel propagation profile and for the radio resource management measurements.

In an embodiment, the obtaining 902 of the radio channel propagation profile comprises: disabling 918 a multiple-input procedure of a multiple-input and multiple-output (MIMO) during at least a part of the receiving of the reference signal. The multiple-input procedure of the MIMO may need to be disabled to ensure reception of the multipath information, because MIMO may reduce the channel variation measured at the UE and, in turn, this will remove the differences between different radio channel propagation profiles. Disabling of MIMO may be achieved by collecting the received signal individually at each antenna port by the UE, rather than after the combining of the signals from different antenna ports.

In an embodiment, the obtaining 902 of the radio channel propagation profile comprises: disabling 920 beamforming during at least a part of the receiving of the reference signal. Beamforming is not mandatory for a UE, but in case beamforming is implemented, it may need to be disabled during the channel estimation.

The UE extracts from the channel reception certain properties of the radio propagation and may select one radio channel propagation profile from a predetermined set of radio channel propagation profiles based on one or more properties meeting at least one criterion, i.e. best match of measurements to one of the known radio channel propagation profiles. Non-limiting examples of these properties comprise the delay spread, signal amplitude or variations, and the number of taps. To this end, it may be assumed that the channel's impulse response is modelled by a tapped delay line model, where one tap corresponds to one sampling time. An embodiment of the algorithm for the radio channel propagation profile estimate based on the number of taps:

```
Perform a radio channel propagation profile estimate:
    if number of taps = 1
        then it is Rural Area
    if number of taps = 2 and relative delay of tap-2 ≥ 10 us
        then it is Hilly Terrain
    else
        other radio channel propagation profile.
```

In this example, the RA profile is associated with a 1-tap channel and it is selected if only one tap is detected in the channel's impulse response. Likewise, the HT profile is associated with a 2-tap channel and it is selected if two taps are detected, wherein the relative timing between the taps is larger than or equal to 10 us. Note that the algorithm gives an outline of the embodiment, whereas the exact algorithm for estimating the taps and the timing and level for each channel profile may require further study.

FIG. 2 discloses an antenna array receiving with all elements 200A, 200B, 200C, whereby reception beamforming may be utilized to achieve directional signal reception. The radio signal 130 is directionally received by combining antenna elements 200A, 200B, 200C so that signals at particular angles experience constructive interference while others experience destructive interference. MIMO is a much more complex technique, wherein multiple signal streams are transmitted through multiple transmit antennas and received with the plurality of antenna elements 200A, 200B, 200C.

In an embodiment of FIG. 3, only the first antenna element 200A is active, and the other antenna elements 200B, 200C are disabled 300. The antenna element 200A, normally used for beamforming at the UE, may be tuned to open at its maximum wide range (e.g. 180° or higher) to capture the reflections within this space. In an embodiment of FIG. 4, the radio signal 130 is received with a dedicated omnidirectional antenna 400. With each of these two embodiments, the reception beamforming of the radio signal 130 may be disabled 920, and/or the multiple-input procedure of the MIMO for the reception of the radio signal 130 may be disabled 918.

In an embodiment, the obtaining 902 of the radio channel propagation profile comprises: selecting 922 the radio channel propagation profile from among a plurality of predetermined radio channel propagation profiles based on one or more propagation properties of the radio channel matching one or more predetermined conditions. In an embodiment, the one or more predetermined conditions comprise one or more of a delay spread condition, a signal amplitude condition, a variation of the signal amplitude condition, and/or a number of taps condition.

Table 1 illustrates selecting 922 the radio channel propagation profile according to the rms (root mean square) delay spread from among the plurality of different predetermined radio channel propagation profiles.

TABLE

Radio channel propagation profiles classified according to delay spread

| Radio channel propagation profile | Delay spread | High level logic for RRM measurement relaxation |
|---|---|---|
| Urban Micro | 0.25 us | Smaller cell with fast changes in the radio channel. Only very limited relaxation is applied. |
| Urban Macro | 0.65 us | Medium size cell with fast changes in the radio channel. Only limited relaxation is applied. |
| Typical Urban | 0.65 us | Same as Urban Macro |
| Bad Urban | 0.25 us | Same as Urban Micro |
| Rural Area | 0.05 us | Large cell with slow changes in the radio channel. Safe to use measurement relaxation because the serving cell covers a large geographical area and therefore the UE may omit neighbour cell measurements. |
| Hilly Terrain | 15 us | Large cell with slow changes. See Rural Area |
| Indoor in a smaller cell | 0.05 us | It is safe partially relax the measurements and measuring only a minimum set of neighbour cells that may be relevant in that geographical area. |
| Indoor in a larger cell | 0.05 us | It is safe to relax measurements because the UE is in a confined geographical area, where the neighbour cells are not relevant (and their relevance remains unchanged over time). |

In an embodiment illustrated in FIG. 9C, the radio channel propagation profile indicates a variation rate of the radio signal received by the user apparatus 100. Table 1 illustrates the rate of changes in different radio channel propagation profiles. The adjusting 904 of radio resource management measurements of the user apparatus 100 based on the radio channel propagation profile comprises a test 960: if the radio channel propagation profile is slow-varying (like Rural Area or Hilly Terrain), the user apparatus 100 may apply a higher level of measurement relaxation in 962, or else the user apparatus 100 does not change the relaxation of the measurements, or even increases the measurements in 964.

In an embodiment, the obtaining 902 of the radio channel propagation profile comprises: detecting 914 a configuration of synchronization signal blocks containing the reference signal, and determining 916 the radio channel propagation profile based on the configuration. The configuration comprises a number of beams and their azimuth and elevation. Such configuration (in an embodiment of the SS/PBCH block explained earlier) may directly indicate a cell type, which is used in the determining 912 of the radio channel propagation profile.

In an embodiment, the obtaining 902 of the radio channel propagation profile comprises: receiving 924 by the user apparatus information related to the radio channel propagation profile from a network entity. The received information may indicate directly the radio channel propagation profile as determined by the network (by the network entity, for example). In addition to this, or instead this, the information received from the network entity may be implicit: not the radio channel propagation profile directly but a cell type (Rural Area, Hilly Terrain etc. as shown in the Table) and/or a cell size (i.e., a cell coverage area, expressed in meters/dBm for example).

In an embodiment, the obtaining 902 of the radio channel propagation profile comprises: obtaining 902 the radio channel propagation profile after a cell has been selected 930, after a cell has been reselected 932, and/or a handover has been performed 934 by the user apparatus. With this embodiment, the radio channel propagation profile is intended to be estimated at least once for each cell.

In an embodiment, the obtaining 902 of the radio channel propagation profile comprises: after the radio channel propagation profile has been obtained 902, storing 950 the radio channel propagation profile.

In an embodiment, the obtaining 902 of the radio channel propagation profile comprises: prior to a current obtaining 902 of the radio channel propagation profile, checking 936 if the radio channel propagation profile has been stored; and if the radio channel propagation profile has been stored 936-YES, fetching 938 the stored radio channel propagation profile for use in a current adjusting 904 of the radio resource management measurements.

In an embodiment, the obtaining 902 of the radio channel propagation profile comprises: detecting 940 a trigger condition related to the user apparatus, and obtaining 902 the radio channel propagation profile in response to the detecting 940 of the trigger condition. After the initial estimate, the radio channel propagation profile may be re-evaluated only if certain triggers are met in order to lower its processing overhead.

In an embodiment, the trigger condition is detected 940 if the radio resource management measurements include one or more of a change 942 in a received power level (RSSI/RSRP) matching a predetermined power level condition, a change 944 in a received quality (RSRQ) matching a predetermined quality condition, a change 946 in a quality of service (QoS), and/or a change 948 between an outdoor location and an indoor location of the user apparatus. For instance, when entering an indoor location, the radio channel propagation profile may suddenly be characterized by more reflections even in cases where the cell is characterized by a stable/flat profile.

In an embodiment, the adjusting 904 of the radio resource management measurements comprises: relaxing 952 the radio resource management measurements in response to the obtaining of the radio channel propagation profile. With this embodiment, pure UE-based RRM measurement relaxation based on the radio channel propagation profile may be implemented, assuming that no network-based relaxation is implemented. The current known mobility measures rely on RRM measurements (RSRP/RSRQ) even when they are relaxed. This is mainly assuming that the RSRP of serving cell will determine whether to relax the measurements of the neighbour cells.

In an embodiment, the adjusting 904 of the radio resource management measurements comprises: relaxing 954 additionally the already relaxed radio resource management measurements in response to the obtaining of the radio channel propagation profile, wherein the radio resource management measurements have already been relaxed based on a network defined condition and corresponding received parameters (such as the radio resource management measurements performed by the user apparatus matching a predetermined power and/or quality condition, and/or a a mobility state of the user apparatus matching a predetermined mobility condition). With this embodiment, UE-based RRM measurement relaxation may be combined on top of a network-based RRM measurement relaxation.

In an embodiment, the adjusting 904 of the radio resource management measurements comprises: cancelling 956 the relaxing of the radio resource management measurements in response to the obtaining of the radio channel propagation profile. With this embodiment, both the pure UE-based relaxation and the combination of the UE-based and network-based relaxation may be cancelled.

Figure 10:
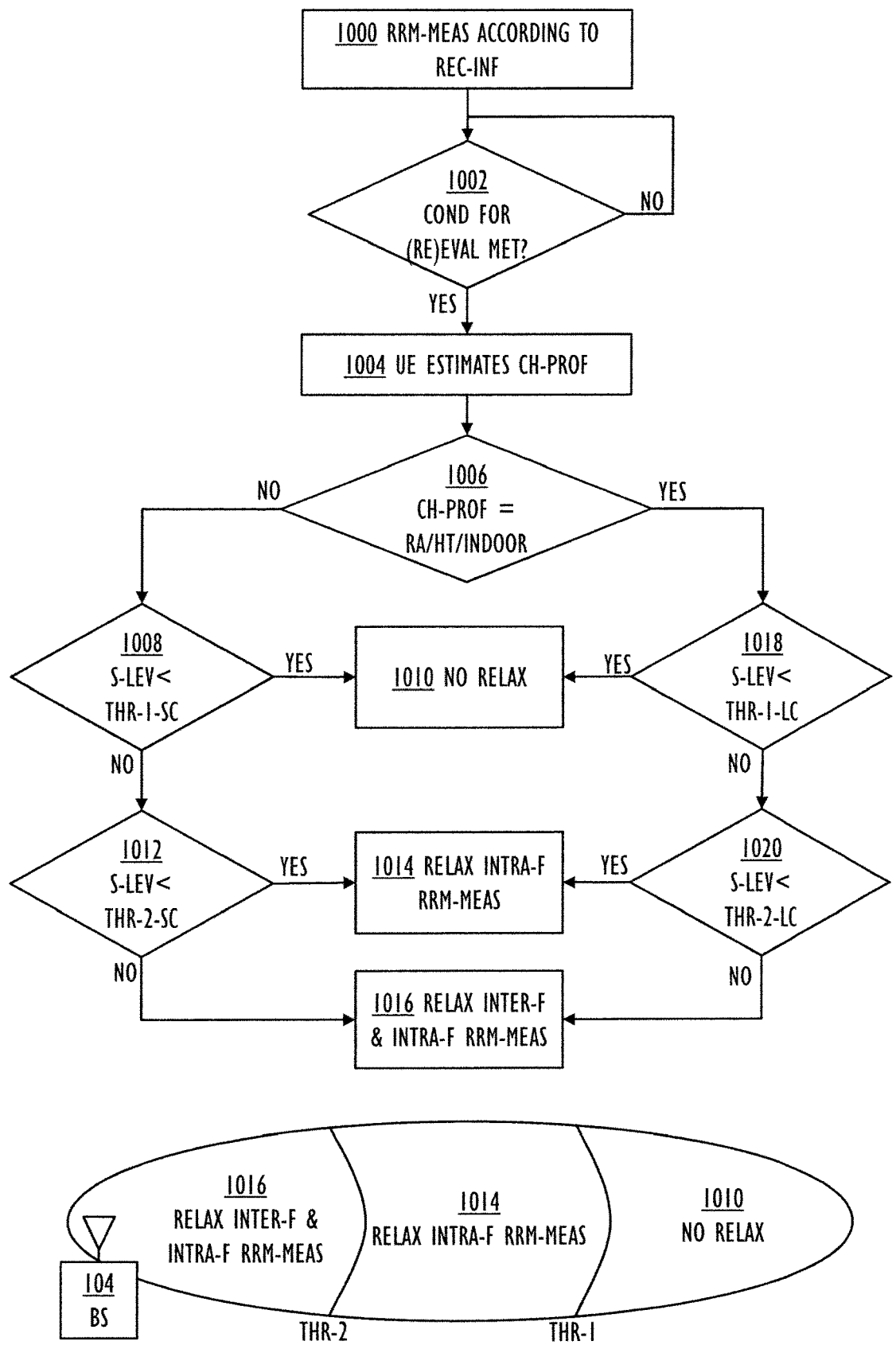
FIG. 10, FIG. 11 and FIG. 12 illustrate further embodiments of the method.

With reference to FIG. 10, let us study further embodiments related to the pure UE-based RRM measurement relaxation. The upper part of the FIG. 10 is a flow-chart, and the lower part illustrates an embodiment of a cell implemented by the base station 104.

In 1000, UE performs RRM measurements. The RRM measurements may be performed according to received information. The information may be received from the network in SIB/RRC (System Information Block/Radio Resource Control protocol).

In 1002, it is checked whether a condition for a radio channel propagation profile evaluation or re-evaluation is met. This may be implemented in a similar fashion as the detecting 940 of the trigger condition. If the condition is not met, the check is repeated (after the trigger is detected 940, or after a predetermined time or at regular intervals, for example). If the condition is met, the user apparatus 100 estimates 1004 the radio channel propagation profile as described before with operations 902, 910, 912, 914, 916, 918, 920 and 922, for example.

In 1006, is is checked whether the estimated radio channel propagation profile is Rural Area, Hilly Terrain or Indoor.

If the estimated radio channel propagation profile is not Rural Area, Hilly Terrain, or Indoor, S-LEV (=serving cell RSRP/RSRQ) is checked against THR-1-SC (=a first threshold of a smaller cell, see Table) in 1008. If S-LEV is smaller than THR-1-SC, no relaxation of RRM measurements is performed in 1010. If S-LEV is not smaller than THR-1-SC, another check is made in 1012: S-LEV is checked against THR-2-SC (=a second threshold of the smaller cell). If S-LEV is smaller than THR-2-SC, intra-frequency RRM measurements are relaxed in 1014. If S-LEV is not smaller than THR-2-SC, both inter-frequency and intra-frequency RRM measurements are relaxed in 1016.

If the estimated radio channel propagation profile is one of Rural Area, Hilly Terrain, or Indoor, S-LEV is checked against THR-1-LC (=a first threshold of a larger cell, see Table) in 1018. If S-LEV is smaller than THR-1-LC, no relaxation of RRM measurements is performed in 1010. If S-LEV is not smaller than THR-1-LC, another check is made in 1020: S-LEV is checked against THR-2-LC (=a second threshold of the larger cell). If S-LEV is smaller than THR-2-LC, intra-frequency RRM measurements are relaxed in 1014. If S-LEV is not smaller than THR-2-LC, both inter-frequency and intra-frequency RRM measurements are relaxed in 1016.

Note that THR-2-LC<<("is much smaller than") THR-2-SC, and THR-1-LC<<THR-1-SC. The relaxation may reduce the number of frequency layers/cells/and/or periodicity of the measurements. The UE mobility state may also be taken into account: in addition to S-LEV, the mobility state may also affect the decisions.

Figure 11:
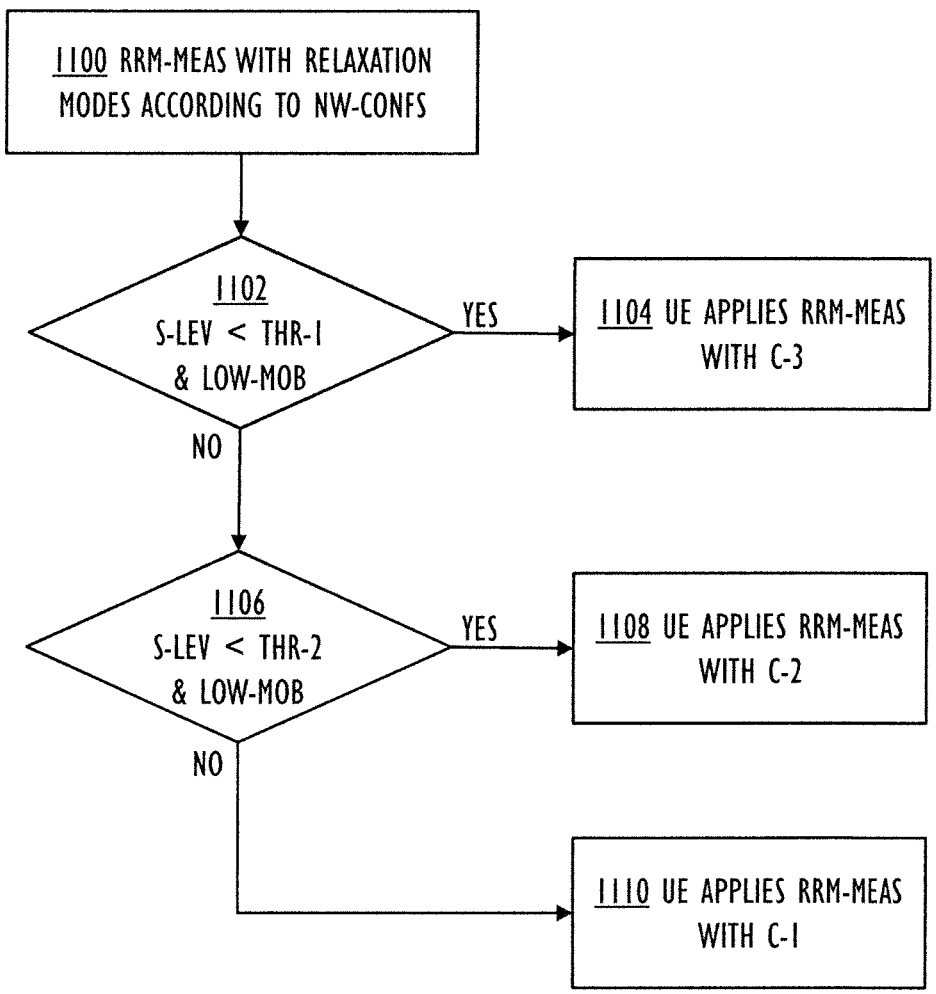
Figure 11:
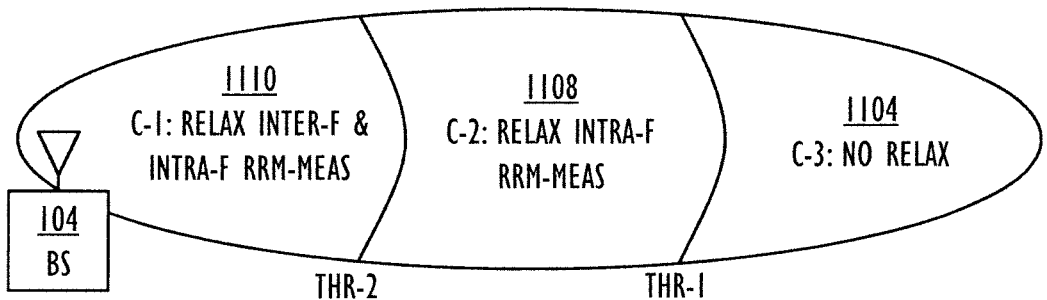

With reference to FIG. 11, let us study further embodiments related to the network-based RRM measurement relaxation.

In 1100, UE performs RRM measurements with relaxation modes according to network-configurations C-1 1110, C-2 1108 and C-3 1104.

In 1102, S-LEV (=serving cell RSRP/RSRQ) is checked against THR-1 (=a first threshold). If S-LEV is smaller than THR-1C, UE applies RRM measurements with C3: no relaxation of RRM measurements is performed in 1104. If S-LEV is not smaller than THR-1, another check is made in 1106: S-LEV is checked against THR-2 (=a second threshold). If S-LEV is smaller than THR-2, UE applies RRM measurements with C-2: intra-frequency RRM measurements are relaxed in 1108. If S-LEV is not smaller than THR-2, UE applies RRM measurements with C-1: both inter-frequency and intra-frequency RRM measurements are relaxed in 1110.

Figure 12:
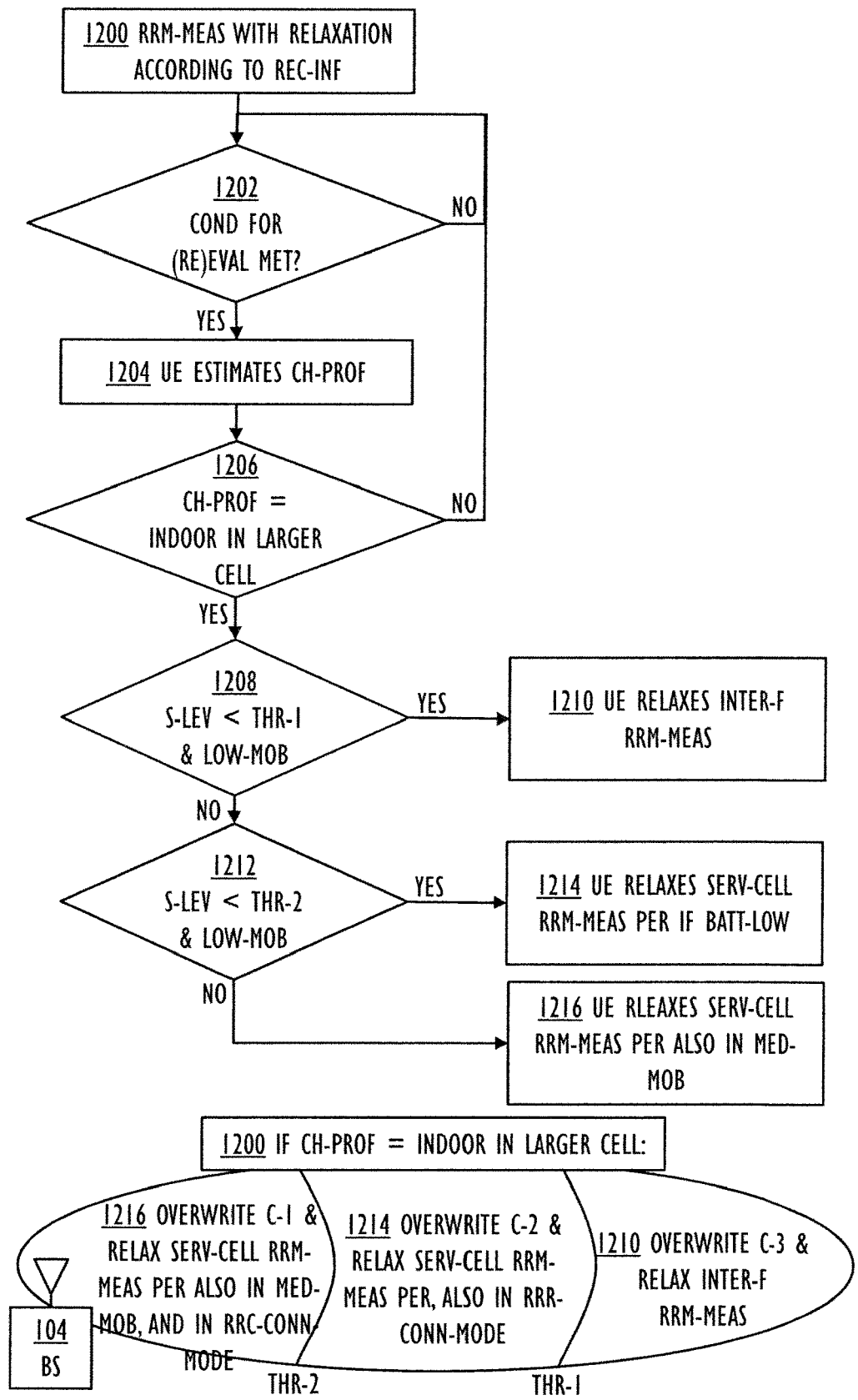

With reference to FIG. 12, let us study further embodiments related to the UE-based RRM measurement relaxation combined on top of the network-based RRM measurement relaxation.

In 1200, UE performs RRM measurements with relaxation modes according to network-configurations C-1 1110, C-2 1108 and C-3 1104 as shown in FIG. 11.

In 1202, it is checked whether a condition for a radio channel propagation profile evaluation or re-evaluation is met. This may be implemented in a similar fashion as the detecting 940 of the trigger condition. If the condition is not met, the check is repeated (after the trigger is detected 940, or after a predetermined time or at regular intervals, for example). If the condition is met, the user apparatus 100 estimates 1204 the radio channel propagation profile as described before with operations 902, 910, 912, 914, 916, 918, 920 and 922, for example.

In 1206, is is checked whether the estimated radio channel propagation profile is Indoor in larger a cell (see Table).

If the estimated radio channel propagation profile is not Indoor in a larger cell, the operation is looped back to 1202.

If the estimated radio channel propagation profile is Indoor in a larger cell, S-LEV is checked against THR-1 (=a first threshold), and it is also checked whether the UE is in a low mobility state in 1208. If S-LEV is smaller than THR-1 and the UE is in the low mobility state, UE relaxes inter-frequency RRM measurements in 1210, and also overwrites C-3. If S-LEV is not smaller than THR-1 or UE is not in a low mobility state, another check is made in 1212: S-LEV is checked against THR-2 (=a second threshold), and it is again checked whether the UE is in a low mobility state. If S-LEV is smaller than THR-2 and the UE is in the low mobility state, UE relaxes serving cell RRM measurements if battery is low in 1214 (possibly also in RRC connected mode), and also overwrites C-2. If S-LEV is not smaller than THR-2 or UE is not in a low mobility state, UE relaxes periodicity of serving cell RRM measurement also in a medium mobility state in 1216 (possibly also in RRC connected mode), and also overwrites C-1.

With the described embodiments, the radio channel propagation profile may be estimated in the UE with very minimal effort and be extended for usage for power-save handling. The embodiments describe a simple approach as it may valid per cell, where the cell change is slower compared with other metrics such as RSRP measurements.

The embodiments may be used to complement a scheme, where RSRP/RSRQ measurements are utilized to estimate the possibility for the UE to enter/exit RRM measurements relaxation for power saving. Using the channel profile for adjusting the measurement activity, e.g. to control the RRM measurements relaxation, enables further power saving as compared to RSRP-based relaxation, for example.

In addition, the radio channel propagation profile estimate may be used in addition to (complementing) network assistance information such as e.g. RSRP/RSRQ thresholds to trigger measurement relaxation. In an embodiment, the base station having a large cell coverage area in a hilly/rural terrain sets an aggressive RSRP threshold to trigger aggressive measurement relaxation, which is safe in this profile, alternatively, the network may indicate the profile type to the UE, or if the UE determines an indoor location, the UE may offset the received RSRP threshold by X dB (e.g. +10 dB) and, otherwise (outdoor location), it will apply the received threshold.

Even though the invention has been described with reference to one or more embodiments according to the accompanying drawings, it is clear that the invention is not restricted thereto but can be modified in several ways within the scope of the appended claims. All words and expressions should be interpreted broadly, and they are intended to illustrate, not to restrict, the embodiments. It will be obvious to a person skilled in the art that, as technology advances, the inventive concept can be implemented in various ways.

The invention claimed is:

1. An apparatus comprising:
one or more memories including computer program code; and
one or more processors to execute the computer program code to cause the apparatus to perform at least the following:
obtaining a radio channel propagation profile for a user apparatus, wherein the radio channel propagation profile indicates multipath effects on a radio signal received by the user apparatus; and
adjusting radio resource management measurements of the user apparatus based on the radio channel propagation profile.

2. The apparatus of claim 1, wherein the obtaining of the radio channel propagation profile comprises:
receiving by the user apparatus a reference signal; and
determining the radio channel propagation profile based on the reference signal.

3. The apparatus of claim 2, wherein the reference signal comprises a demodulation reference signal.

4. The apparatus of claim 2, wherein the obtaining of the radio channel propagation profile comprises:
disabling a multiple-input procedure of a multiple-input and multiple-output during at least a part of the receiving of the reference signal.

5. The apparatus of claim 2, wherein the obtaining of the radio channel propagation profile comprises:
disabling beamforming during at least a part of the receiving of the reference signal.

6. The apparatus of claim 2, wherein the obtaining of the radio channel propagation profile comprises:
selecting the radio channel propagation profile from among a plurality of predetermined radio channel propagation profiles based on one or more propagation properties of the radio channel matching one or more predetermined conditions.

7. The apparatus of claim 6, wherein the one or more predetermined conditions comprise one or more of a delay spread condition, a signal amplitude condition, a variation of the signal amplitude condition, and/or a number of taps condition.

8. The apparatus of claim 2, wherein the obtaining of the radio channel propagation profile comprises:
detecting a configuration of synchronization signal blocks containing the reference signal, the configuration comprising a number of beams and their azimuth and elevation; and
determining the radio channel propagation profile based on the configuration.

9. The apparatus of claim 1, wherein the obtaining of the radio channel propagation profile comprises:
receiving by the user apparatus information related to the radio channel propagation profile from a network entity.

10. The apparatus of claim 1, wherein the obtaining of the radio channel propagation profile comprises:
obtaining the radio channel propagation profile after a cell has been selected, after a cell has been reselected, and/or a handover has been performed by the user apparatus.

11. The apparatus of claim 1, wherein the obtaining of the radio channel propagation profile comprises:
detecting a trigger condition related to the user apparatus; and
obtaining the radio channel propagation profile in response to the detecting of the trigger condition.

12. The apparatus of claim 11, wherein the trigger condition is detected if the radio resource management measurements include one or more of a change in a received power level matching a predetermined power level condition, a change in a received quality matching a predetermined quality condition, a change in a quality of service, and/or a change between an outdoor location and an indoor location of the user apparatus.

13. The apparatus of claim 1, wherein the obtaining of the radio channel propagation profile comprises:
after the radio channel propagation profile has been obtained, storing the radio channel propagation profile.

14. The apparatus of claim 13, wherein the obtaining of the radio channel propagation profile comprises:
prior to a current obtaining of the radio channel propagation profile, checking if the radio channel propagation profile has been stored; and
if the radio channel propagation profile has been stored, fetching the stored radio channel propagation profile for use in a current adjusting of the radio resource management measurements.

15. The apparatus of claim 1, wherein the adjusting of the radio resource management measurements comprises:
relaxing the radio resource management measurements in response to the obtaining of the radio channel propagation profile.

16. The apparatus of claim 1, wherein the adjusting of the radio resource management measurements comprises:
relaxing additionally the already relaxed radio resource management measurements in response to the obtaining of the radio channel propagation profile, wherein the radio resource management measurements have already been relaxed based on a network defined condition and corresponding received parameters.

17. The apparatus of claim 1, wherein the adjusting of the radio resource management measurements comprises:
cancelling the relaxing of the radio resource management measurements in response to the obtaining of the radio channel propagation profile.

18. The apparatus of claim 1, wherein the radio channel propagation profile indicates a variation rate of the radio signal received by the user apparatus.

19. The apparatus of claim 1, wherein the apparatus is the user apparatus.

20. A method comprising:
obtaining a radio channel propagation profile for a user apparatus, wherein the radio channel propagation profile indicates multipath effects on a radio signal received by the user apparatus; and
adjusting radio resource management measurements of the user apparatus based on the radio channel propagation profile.

21. A non-transitory computer-readable medium comprising program instructions for causing an apparatus to perform at least the following:
obtaining a radio channel propagation profile for a user apparatus, wherein the radio channel propagation profile indicates multipath effects on a radio signal received by the user apparatus; and
adjusting radio resource management measurements of the user apparatus based on the radio channel propagation profile.

* * * * *